No. 886,274. PATENTED APR. 28, 1908.
J. L. TATE.
MEANS FOR PRODUCING MOTIVE POWER.
APPLICATION FILED APR. 27, 1907.

WITNESSES

INVENTOR
John Lincoln Tate
BY
ATTORNEYS

UNITED STATES PATENT OFFICE.

JOHN LINCOLN TATE, OF JERSEY CITY, NEW JERSEY.

MEANS FOR PRODUCING MOTIVE POWER.

No. 886,274.   Specification of Letters Patent.   Patented April 28, 1908.

Application filed April 27, 1907. Serial No. 370,644.

*To all whom it may concern:*

Be it known that I, JOHN LINCOLN TATE, a citizen of the United States, and a resident of Jersey City, in the county of Hudson and State of New Jersey, have invented a new and Improved Means for Producing Motive Power, of which the following is a full, clear, and exact description.

This invention relates to certain improvements in means for utilizing heat energy in the production of motive power, and an object of the invention is to utilize the products of combustion of a liquid or gaseous fuel for the operating of an engine and to add to said products by the injecting action thereof, a second fluid of a low temperature, whereby a motive fluid is formed of a temperature sufficiently low to prevent injury to the engine, but, at the same time, of high pressure and velocity.

A further object of the invention is to increase the efficiency of the engine by utilizing the latent heat of the exhaust, and also utilizing the exhaust gas of another engine.

Figure 1:
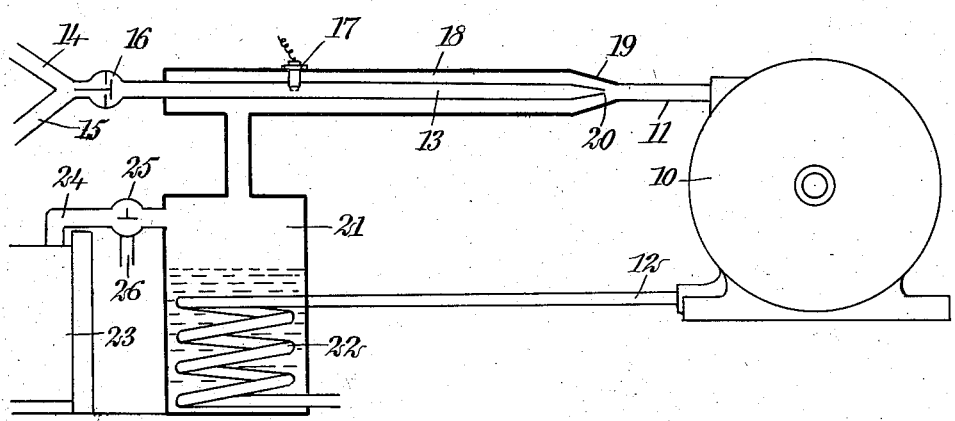
Figure 2:
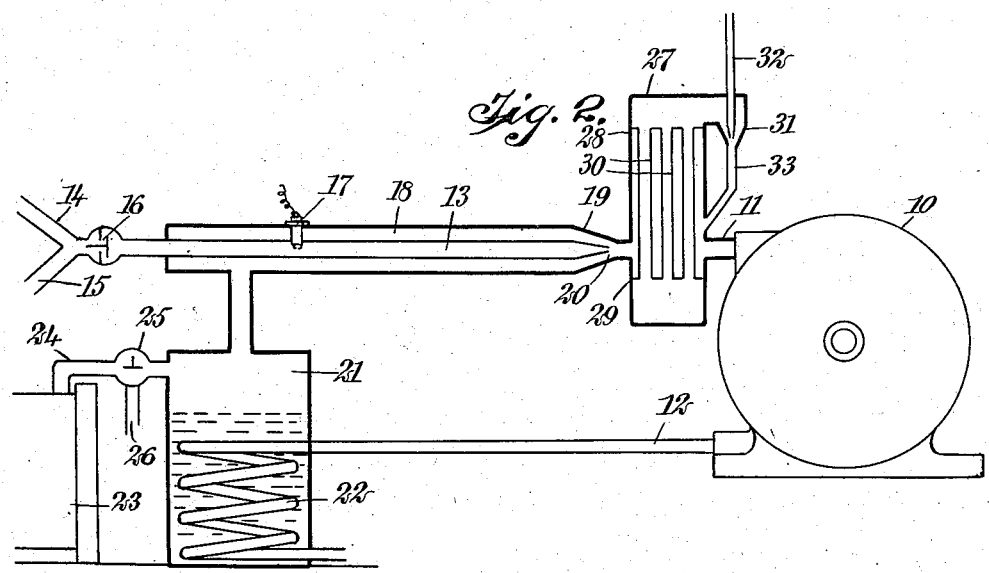

Reference is to be had to the accompanying drawings, forming a part of this specification, in which similar characters of reference indicate corresponding parts in both the figures, and in which Figure 1 is a diagrammatic illustration of an apparatus constructed in accordance with my invention; and Fig. 2 is a diagrammatic illustration of a modified form.

In a system constructed in accordance with my invention, I desire to employ an explosive mixture as the main motive agent for driving the engine, and utilize not only the expansion of said mixture at the time of the ignition thereof, but also the velocity of the mixture in leaving the combustion chamber. The products of combustion leave the combustion chamber at a very high velocity and are at an extremely high temperature, in fact, such a temperature as render their use in an engine practically impossible. It is necessary that the moving parts of the engine be kept at a reasonably low temperature, and this is usually accomplished by the use of a water jacket or other similar means. In my improved system I provide means for cooling the products of combustion as they pass from the combustion chamber to the engine, so that they may be used in the engine without danger of injuring the latter. To cool said products, I add thereto a fluid of a materially low temperature which in expanding, due to its becoming heated, neutralizes the reduction in pressure of the products of combustion as the latter are cooled.

In my improved system I employ an engine 10 of any suitable character, either turbine, rotary or reciprocating, but preferably of the former type. The engine may be provided with any suitable form of controlling valves, governors, and the like, and adapted for the supply of a motive fluid through an inlet conduit 11, and the delivery of the exhaust gas through a conduit 12.

The chief features of my invention relate to the production of the motive fluid, such means being connected directly to the conduits 11 and 12.

For producing and igniting the explosive mixture, I provide a combustion chamber 13, preferably in the form of an elongated tube having separate air and gas conduits 14 and 15 delivering thereto and having a check valve 16 to prevent back firing in case any air and gas are not delivered under sufficiently high pressure to maintain a continuous combustion in the chamber 13. Any suitable means may be provided, as, for instance, a spark plug 17 for igniting the gas within the chamber. Surrounding the chamber 13 is a jacket 18 having one end 19 thereof conical in form and connected directly to the inlet conduit 11 of the engine. The end of the combustion chamber is also conical in form and terminates in a discharge nozzle 20 adjacent the inlet end of the conduit 11, and within the conical end 19 of the jacket. This nozzle is smaller in cross section than the conduit 11, and is located concentric therewith, whereby the escape of the products of combustion from said combustion chamber causes an ejecting action upon the fluid in the jacket 18, and causes the two fluids to be delivered together through the conduit 11 into the engine. The jacket 18 connects directly to a chamber 21 for the reception of water, the interior of said chamber being normally at a pressure below that of the atmosphere, due to the ejecting action of the nozzle 20. Within the chamber 21 and below the normal water level thereof is provided a coil 22, one end of which communicates with the atmosphere and the other end of which communicates with the exhaust pipe 12 of the engine.

In the operation of my improved motive fluid generating means, air and gas under high pressure are delivered through the conduits 14 and 15 and check valve 16 into the combustion chamber 13. The explosive mixture thus formed is ignited by the spark plug 17, and the products of combustion under very high temperature rush at a high velocity through the nozzle 20 into the conduit 11 and into the engine to operate the same. By the ejecting action of the nozzle 20, a partial vacuum is produced in the jacket 18, and the water within the chamber 21 is caused to rapidly vaporize at a pressure materially below that of the atmosphere, and the water vapor uniting with the hot products of combustion serves to cool the latter. This cooling necessarily results in a reduction in pressure, but the heating of the water vapor and the adding of said water vapor to the products of combustion largely compensates for this reduction in pressure, so that the fluid delivered through the conduit 11 and into the engine is under high pressure and traveling at high velocity although at a sufficiently low temperature to prevent an injurious effect upon the engine parts.

The air and gas are delivered through the conduits 14 and 15 at such a pressure that they travel through the combustion chamber 13 at a velocity greater than that of flame propagation, whereby a continuous combustion takes place in the chamber rather than an intermittent series of explosions. After the apparatus is started, the igniter may, if desired, be cut out of circuit and the combustion maintained independently thereof. All heat of combustion radiated from the chamber 13 is absorbed by the surrounding jacket and is thus conserved for use in the engine. The exhaust gases escaping through the conduit 12 contain a large quantity of heat and the latent heat of condensation of the water. By delivering the exhaust gases through the coil 22 in the chamber 21, which chamber may, if desired, be termed "a boiler," the water is heated and the exhaust gases correspondingly cooled. Due to the maintenance of a pressure within the boiler less than that of the outside atmosphere, the boiling point of said water is maintained below 212 degrees, Fahrenheit, and all steam in the exhaust gases will be condensed in the coil 22 and the latent heat of condensation thus utilized for the heating of the water. For instance, if the ejecting action at the nozzle 20 causes a reduction of seven pounds pressure in the jacket and boiler, the water in said boiler will boil at approximately 180 degrees, Fahrenheit, and the exhaust gases and water of condensation will leave the coil at this temperature.

I may, if desired, employ a construction as above described in connection with an ordinary steam engine and utilize the exhaust steam from said engine in my improved system. In Fig. 2 of the drawings I have illustrated a portion of the cylinder of an ordinary steam engine 23, the exhaust gases from which escape through the conduit 24. This conduit may be connected directly to the upper portion of the boiler 21, whereby the partial vacuum maintained in said jacket increases the efficiency of the engine 23 and the heat of the exhaust steam is utilized in the operation of the engine 10. The conduit 24 connecting the engine and the boiler 21 may, if desired, be provided with a three-way valve 25. The conduit 24 is provided with a branch conduit 26 leading to the three-way valve, whereby the engine 23 may exhaust to the atmosphere, or the boiler 21 draw from the atmosphere, if it is not desired to use the two in conjunction.

In order to further cool the hot products of combustion escaping through the nozzle 20, and in order to further add to the fluids delivered to the engine, I may, if desired, employ the construction illustrated in Fig. 2, in which there is interposed in the conduit 11, a chamber 27 having transverse partitions 28 and 29 adjacent the upper and lower ends thereof and connected by a plurality of tubes 30 in communication with the space above the first mentioned partition and below the last mentioned partition. The conduit 11 is connected to opposite sides of the chamber between the partitions, whereby the products of combustion and the water vapor from the boiler 21 or the engine 23 pass into the space surrounding the tubes 30 and on to the engine. The tubes and the space below the same are filled with water and serve as an auxiliary boiler. The portion of the boiler 27 above the partition 28 communicates with an ejector 31 having a conduit 32 for a fluid under pressure and having an exhaust conduit 33 delivering to the space surrounding the tubes 30. The products of combustion are cooled by their passage in contact with the tubes 30, and the water within said tubes is heated and vaporized under the partial vacuum created by the injector 31. This water vapor in entering the space surrounding the tubes 30 unites with the products of combustion and is delivered therewith into the engine. In this manner the high temperature of the products of combustion is still further reduced and the second reduction in volume is made up for by the addition of the steam or water vapor entering through the conduit 33. Any suitable fluid under pressure may be employed for operating the ejector, as, for instance, compressed air.

Having thus described my invention, I claim as new and desire to secure by Letters Patent:

1. In combination, an engine, a combustion chamber delivering thereto, a jacket surrounding said combustion chamber, and means whereby water vapor is passed through said jacket and also delivered to said engine.

2. In combination, an engine, a boiler, a conduit connecting the same, an ejector for maintaining a pressure within said boiler below that of the atmosphere and delivering the vapor therefrom to said engine, and a combination chamber within said conduit and delivering to said ejector for heating said vapor intermediate the boiler and the engine.

3. In combination, an engine, a boiler, means for delivering the vapor from said boiler to said engine heating the vapor intermediate the boiler and the engine and maintaining a pressure within the boiler below that of the atmosphere, and means for heating said boiler by the exhaust fluid from said engine.

4. In combination, an engine, a boiler, a combustion chamber, means for delivering an explosive mixture to said chamber, an igniter, a jacket surrounding said combustion chamber and communicating with said boiler, a conduit connecting said chamber to said engine, and an ejecting nozzle receiving its motive fluid from said combustion chamber and serving to force the water vapor from said jacket into said engine and maintain a pressure in said boiler below that of the atmosphere, and means for heating said boiler by the exhaust gases from said engine.

5. In combination, a primary engine, a secondary engine, a combustion chamber, means for delivering the exhaust steam from the primary engine adjacent the combustion chamber, and means for delivering the products of combustion and said exhaust steam to the secondary engine.

6. In combination, a primary engine, a secondary engine, a combustion chamber, a jacket surrounding the same, means for delivering the exhaust steam from the primary engine to said jacket, and means for delivering the products of combustion and said exhaust steam to the secondary engine.

7. In combination, a primary engine, a secondary engine, a combustion chamber, means for delivering the exhaust steam adjacent said combustion chamber, and means for delivering the products of combustion and the exhaust steam to said secondary engine by the ejecting action of said products of combustion.

In testimony whereof I have signed my name to this specification in the presence of two subscribing witnesses.

JOHN LINCOLN TATE.

Witnesses:
GRANT SCOTT,
F. M. DECKER.